United States Patent Office 3,460,955
Patented Aug. 12, 1969

3,460,955
INORGANIC GLASS COATING AND METHOD FOR MAKING
Ellis John Airola, Lynn, Mass., assignor to General Electric Company, a corporation of New York
No Drawing. Filed Nov. 22, 1965, Ser. No. 509,158
Int. Cl. C23f 11/00; C09d 1/02
U.S. Cl. 106—74        8 Claims

ABSTRACT OF THE DISCLOSURE

An inorganic phosphate material of improved corrosion resistance and stability and useful as pigmented or unpigmented coating material is the reaction product of an aqueous mixture of phosphoric acid, chromic acid, acidic sodium silicate sol, magnesium and magnesium phosphate dibasic when the ratio of the phosphoric acid to the magnesium phosphate dibasic is at least 1. One pigmented form includes finely divided aluminum.

---

This invention relates to inorganic coatings and, more particularly, to an inorganic phosphate-silicate glass coating and method for making.

Metallic pigmented coatings including binders of organic resins or silicones are limited in their use by the decomposition temperature of such binders. Generally above such temperatures as about 600° F., the binders decompose leaving the pigment, silica if a silicone is included and perhaps varying amounts of carbon. If any kind of bond remains between the coating and the coated article, it is based primarily upon attraction between the pigment and the base article. It is necessary to raise the temperature considerably above 600° F. to achieve any successful degree of diffusion bonding between the metallic pigment, frequently aluminum, and the base metal. However, processing of articles such as blades for axial flow compressors at certain elevated temperatures can reduce mechanical properties and can change accurate dimensions because the articles may warp or bend.

Because the inorganic phosphate glasses have somewhat higher temperature resistance than organic resins or silicones, coatings using phosphate glasses as a principal ingredient have been selected for use such as blade coatings because they can be cured at temperatures in the range of about 600–800°. Whereas these coatings provide a base article with some corrosion resistance, much greater resistance to corrosion is required in many applications. In addition, these kinds of coatings are difficult to apply smoothly in very thin coatings and when applied in a thin layer have relatively poor corrosion resistance. Furthermore, it has been found that the corrosion resistance of available coating materials of this type will be affected detrimentally by long shelf life.

It is a principal object of this invention to provide an improved inorganic phosphate-silicate glass material which is easily applied as a thin smooth, adherent coating in the pigmented or unpigmented condition and which has improved corrosion resistance.

Another object is to provide a method for making such an improved material.

These and other objects and advantages will be more readily understood from the following detailed description and examples which are meant to be typical of rather than any limitation on the scope of the present invention.

It has been found that the objects of this invention can be achieved with a pigmented material which is the reaction product of a mixture of, by weight, about 8% to less than 12% phosphoric acid (calculated as 85% $H_3PO_4$); more than 1.3 up to about 5% chromic acid; about 0.4% to less than 0.9% magnesium; about 8% to less than 12% magnesium phosphate dibasic ($MgHPO_4 \cdot 3H_2O$)

about 15–30% acidic sodium silicate sol (calculated as 34% $SiO_2$); 13–30% water with the balance finely divided aluminum, provided the ratio of the phosphoric acid to the magnesium phosphate dibasic is at least 1. In its unpigmented form, the material is the reaction product of a mixture of, by weight, about 13% to less than 16.7% phosphoric acid (85%); more than 2.1 up to about 8.5% chromic acid; about 0.6% to less than 1.5% magnesium; about 12% to less than 19.5% magnesium phosphate dibasic; about 25–42% acidic sodium silicate sol (34% $SiO_2$) and about 22–45% water.

One method by which the material of the present invention can be made comprises the steps of first reacting together the chromic acid, water, phosphoric acid and magnesium. Then the magnesium phosphate dibasic is dissolved in the solution. The solution is cooled and the acidic sodium silicate sol is added followed by the pigment. In a specifically preferred form, all of the magnesium is reacted with sufficient phosphoric acid, chromic acid, and water in one container. All of the added magnesium phosphate dibasic is dissolved in another container with the balance of the chromic acid, phosphoric acid and water. Then the products of reactions from the two containers are mixed together after which the acidic sodium silicate sol is added followed by the pigment.

The material of the present invention combines the characteristics of improved corrosion resistance even when applied as a thin coating, along with ease of application as a smooth, adherent heavy or thin coating. Normally sodium silicate will tend to be unstable in an acid solution such as exists with the presence of phosphoric acid. However, it has been found that if the sodium silicate is added as an acidic sol, a stable solution results. This solution changes to a thixotropic state after about 8–10 weeks of standing. With aluminum as a pigment, this material has unusually good corrosion resistance and results in a smooth surface when applied as a coating.

A review of some of the typical examples of materials and methods for making materials suitable for coatings which were evaluated in the development of the present invention will provide a clearer understanding of the various aspects of the present invention. The examples given are typical of but are not meant to be any limitation on the scope of the present invenion.

As a basis for comparison with regard to corrosion resistance, a commercially available aluminum pigmented coating material including phosphoric acid and phosphate compounds along with about 40 weight percent aluminum and 40 weight percent water was obtained. An analysis has shown that about 19 weight percent of this material is some type of phosphate, with no silicates present. This material has been used as a coating in thicknesses of between 2 and 3 mils to provide corrosion resistance for certain larger components of gas turbine engines which can tolerate heavier coatings without disturbing aerodynamic characteristics. However, corrosion resistant coatings are needed for small components such as the blading members of small axial flow compressors in which a coating thickness of 2–3 mils could seriously affect air flow and efficiency. Consequently, the present invention was evaluated, as far as corrosion resistance is concerned, as a coating of about 1.5 mils or less. For purposes of this description, the standard commercial material will hereinafter be referred to as Example SC.

The following Table I summarizes one series of materials formulated in the evaluation of the present invention.

TABLE I

[Ingredients (wt. percent)]

| | Examples | | | | | |
|---|---|---|---|---|---|---|
| | 1 | 2 | 3 | 4 | 5 | 6 |
| $CrO_3$ | 2.2 | 2.2 | 2.3 | 2 | 2.7 | 3 |
| $H_2O$ | 20 | 30 | 20 | 20 | 25.4 | 25.1 |
| $H_3PO_4$ (85%) | 20 | 25 | 10 | 12 | 8.5 | 8.7 |
| $MgHPO_4 \cdot 3H_2O$ | | | 12 | 12 | 8 | 8 |
| Mg | 2 | 2 | 0.4 | 0.4 | 0.4 | 0.4 |
| Acidic Na silicate sol (34% $SiO_2$) | 15.8 | 15 | 15 | 15 | 15 | 15 |
| Al | 40 | 25.8 | 40.3 | 38.6 | 40 | 38.8 |
| $H_3PO_4/MgHPO_4 \cdot 3H_2O$ | | | 0.8 | 1.0 | 1.1 | 1.1 |

The ingredients of Example 1 had a relatively high phosphoric acid and magnesium content to promote the formation of magnesium phosphate in the absence of any added magnesium phosphate dibasic as a separate chemical and to produce chromium phosphate. However, a precipitation of silicic acid occurred upon the addition of the acidic sodium silicate sol. Furthermore, the binder portion of the mixture of Example 1, as did Example 2, gelled after a shelf life of about 3–7 days. The mixture of Example 2 blistered upon curing at 200° F. and was found to require too much acid to produce the magnesium and chromium phosphates. Therefore, magnesium phosphate dibasic was added in Example 3. However, the ratio of phosphoric acid to magnesium phosphate dibasic in Example 3 was too low (less than 1) to allow all of the magnesium phosphate dibasic to dissolve. As shown by Example 4, the larger amount of phosphoric acid required to bring such ratio to 1 in order to dissolve all of the magnesium phosphate dibasic resulted in an unstable binder which gelled after 6 days because of the high phosphoric acid content. Thus it was found that within the range of this invention 12 weight percent magnesium phosphate dibasic is excessive, and that amounts of phosphoric acid at levels of 12 weight percent or more in the pigmented material will cause early binder gelling of the non-thixotropic type.

It was recognized that gelling of the binder is a function, at least in part, of the phosphoric acid content. Therefore, with the exception of Example 7 shown in subsequent tables, the total phosphoric acid content was maintained at less than 12 weight percent in the pigmented material of the present invention and less than about 16.7 weight percent calculated on the basis of unpigmented binder.

The composition of Examples 5 and 6 were made by first mixing together all of the required chromic acid, water, phosphoric acid and magnesium in order to produce first a solution of magnesium and chromium phosphates as the reaction product of such mixture. The resulting reaction is an exothermic one which raised the temperature of the solution to about 180° F. and dissolved all of the ingredients mixed. After these first ingredients were all in solution, the magnesium phosphate dibasic was added and dissolved. Then the solution was cooled to room temperature after which the acidic sodium silicate sol was added followed by the aluminum.

The pigmented reaction products which resulted from the mixture of Examples 5 and of 6 were sprayed as coatings of 0.9–1.2 mils thickness onto a series of 2" x 5" test panels of A.I.S.I. type 410 stainless steel.

The coatings were applied by spraying with a standard paint spray gun to produce the desired thicknesses. Then the panels were air dried for ½ hour, heated at 200° F. for ½ hour and then heated for ½ hour at 800° F. before cooling to room temperature. All of the heating steps were conducted in an air atmosphere oven.

These panels were subjected to a standard ASTM salt fog test along with panels of the standard commercial product (Example SC) coated to the same thickness and used as control panels. After three hours, the panels coated with Example SC displayed many corrosive sites. After 168 hours exposure, the panels coated with the Example 5 reaction product still had a smooth, adherent surface and no corrosion sites. When Example 5 coated panels were examined after 240 hours exposure only one of the panels had developed a single corrosion site. Similarly, panels coated with the reaction product of the mixture of Example 6 showed no corrosion sites after 168 hours exposure and the start of some corrosion upon inspection at 240 hours. As was mentioned above, the control panels coated to the same thickness with Example SC developed many corrosion sites in 3 hours.

By maintaining the proper balance of the ingredients as shown by Examples 5 and 6 and by mixing these ingredients as was described in connection with those examples, a reaction product material which provides a smooth, adherent and unusually corrosion resistant barrier or coating can be produced. It has been found that the reaction product of the present invention can be deposited with an ordinary paint spray gun in smooth coatings as thin as about ½ mil and still provide corrosion resistance many times that of the commercially available materials of this type. The present invention provides a stable silicate bearing phosphate glass coating material which maintains its stability even under acidic conditions.

In Examples 1 through 6, the chemicals used were chromic acid—Fischer A-100, magnesium turnings—Baker, purified No. 2420, ortho phosphoric acid (85%)—Fischer A-242, acidic sodium silicate sol (34% $SiO_2$)—Nalco Chemical Co. (Nalcoag 1034A), magnesium phosphate dibasic powder ($MgHPO_4 \cdot 3H_2O$)—Mallinckrodt and aluminum—Reynolds Metal powder, atomized, 6 micron diameter and containing no lubricants. However, it was found that by reacting the magnesium with part of the chromic acid, phosphoric acid and water in a container separate from one in which the magnesium phosphate dibasic was being dissolved by the balance of the chromic and phosphoric acids with the water, the respective reactions and solutions can be more easily obtained. Therefore, it is preferred that the magnesium metal and part of the chromic acid, phosphoric acid and water be mixed in one container. The magnesium phosphate dibasic chemical and the remainder of the phosphoric acid, chromic acid and water are mixed in a second heated container in amounts sufficient to place all of the magnesium phosphate dibasic into solution. According to this method of mixing and reacting of ingredients separately, all of the magnesium phosphate and chromium phosphate produced in the first container will be maintained in solution when the products of the first and second containers were mixed together. Chromic acid in excess of that required in the reaction is included in the material of the present invention to protect the aluminum from being attacked by phosphoric acid. After the ingredients of the first and second containers are mixed together, the acidic sodium silicate sol was added after which the aluminum was introduced.

In order to further evaluate this preferred method form of producing the material of the present invention, a number of examples were studied. Typical of these examplese were those shown in Table II which is separated into several groupings. The first group of materials were mixed in a first container and the second group in a second container. The acidic sodium silicate sol was added after the reaction products of the first and second groups were intermixed. Then the aluminum pigment was added.

In order to more easily visualize the total amounts of chemicals mixed, the following Table III summarizes the total ingredients of the examples of Table II.

TABLE II.—TWO-CONTAINER METHOD
[Ingredients (wt. percent)]

| | | Examples | | | | | | | | | |
|---|---|---|---|---|---|---|---|---|---|---|---|
| | | 7 | 8 | 9 | 10 | 11 | 12 | 13 | 14 | 15 | 20 | 21 |
| I | $CrO_3$ | 2.2 | 2.2 | 0.7 | 0.7 | 0.7 | 1 | 1 | 1 | 1 | 1 | 1 |
| | $H_2O$ | 12 | 10 | 10 | 10 | 10 | 10 | 10 | 11 | 11 | 8 | 6 |
| | $H_3PO_4$ | 4 | 4 | 4 | 4 | 4 | 4 | 4 | 4 | 4 | 4 | 4 |
| | Mg | 0.5 | 0.4 | 0.4 | 0 9 | 0.4 | 0.4 | 0.5 | 0.4 | 0.4 | 0.4 | 0.4 |
| II | $CrO_3$ | | | 1.5 | 1.5 | 0.6 | 2 | 4 | 3.5 | 4 | 4 | 4 |
| | $H_2O$ | 10 | 20 | 15.2 | 14.2 | 15.3 | 15.8 | 12.5 | 13.1 | 12.6 | 10.6 | 7.6 |
| | $H_3PO_4$ | 15 | 7 | 5.2 | 5.7 | 6 | 4.1 | 5 | 4 | 4 | 4 | 4 |
| | $MgHPO_4 \cdot 3H_2O$ | | 8 | 8 | 8 | 8 | 8 | 8 | 8 | 8 | 8 | 8 |
| | $Mg(OH)_2$ | | 2 | | | | | | | | | |
| | Na Silicate | 15 | 15 | 15 | 15 | 15 | 15 | 15 | 15 | 15 | 20 | 25 |
| | Al | 39.3 | 33.4 | 40 | 40 | 40 | 40 | 40 | 40 | 40 | 40 | 40 |
| | $H_3PO_4/MgHPO_4 \cdot 3H_2O$ | | 1.4 | 1.2 | 1.2 | 1.3 | 1.0 | 1.1 | 1.0 | 1.0 | 1.0 | 1.0 |

TABLE III
[Total ingredients (wt. percent)]

| | Examples | | | | | | | | | |
|---|---|---|---|---|---|---|---|---|---|---|
| | 7 | 8 | 9 | 10 | 11 | 12 | 13 | 14 | 15 | 20 | 21 |
| $CrO_3$ | 2.2 | 2.2 | 2.2 | 2.2 | 1.3 | 2.7 | 5 | 4.5 | 5 | 5 | 5 |
| $H_2O$ | 22 | 30 | 25.2 | 24.2 | 25.3 | 25.8 | 22.5 | 24.1 | 23.6 | 18.6 | 13.6 |
| $H_3PO_4$ (85%) | 19 | 11 | 9.2 | 9.7 | 10 | 8.1 | 9 | 8 | 8 | 8 | 8 |
| $MgHPO_4 \cdot 3H_2O$ | | 8 | 8 | 8 | 8 | 8 | 8 | 8 | 8 | 8 | 8 |
| Mg | 0.5 | 0.4 | 0.4 | 0.9 | 0.4 | 0.4 | 0.5 | 0.4 | 0.4 | 0.4 | 0.4 |
| Na Silicate | 15 | 15 | 15 | 15 | 15 | 15 | 15 | 15 | 15 | 20 | 25 |
| Al | 39.3 | 33.4 | 40 | 40 | 40 | 40 | 40 | 40 | 40 | 40 | 40 |
| $Mg(OH)_2$ | | 2 | | | | | | | | | |
| $H_3PO_4/MgHPO_4 \cdot 3H_2O$ | | 1.4 | 1.2 | 1.2 | 1.3 | 1.0 | 1.1 | 1.0 | 1.0 | 1.0 | 1.0 |

The mixture of Example 7 was made to determine if a magnesium salt such as magnesium hydroxide could be substituted for the magnesium phosphate dibasic. However, it was found that too much phosphoric acid was required to dissolve the magnesium hydroxide as shown by the total amount of 19 weight percent phosphoric acid. Consequently the binder gelled. However, the reaction product of Example 8, with a total phosphoric acid content of 11 weight percent and a phosphoric acid to magnesium phosphate dibasic ratio of 1 or greater, resulted in an excellent product which sprayed well. There was no cracking or blistering of the coating after the 800° F. cure. Similarly, the material of Example 9 sprayed well and had the same good adhesion after curing.

Example 10 represented an attempt to increase the amount of chromium phosphate formed in the first container through the addition of an increased amount of magnesium to assist in that reaction. However, the final product, after all of the ingredients had been added, became grainy and then grannular within three days, although the binder did not gel. Therefore, the magnesium added in the mixture which results in the product of the present invention should be less than about 0.9 weight percent in order to maintain the necessary balance of reaction products.

As was mentioned before in connection with Examples 1 through 4, the inclusion of 12 weight percent or more total phosphoric acid (85%) within the range of the material of this invention produces a binder which forms a non-thixotropic gel within a short period of time. However, a careful balance between phosphoric acid and chromic acid must be maintained so that too much of an excess of phosphoric acid does not remain after reaction in the first container. This was substantiated by the reaction product of Example 11 which gelled within a few days, although the product when sprayed immediately after mixing had a coating layer which was smooth and tightly adherent after curing. Therefore more than a total of 1.3 weight percent chromic acid should be included in the material of this invention to assist the solution of the magnesium phosphate dibasic within the range of the present invention.

The ingredients of Examples 12 through 15 result in satisfactory reaction products. Corrosion testing in the standard ASTM salt fog chamber of the reaction product of Example 12 after spraying to thicknesses of between 0.45 and 0.75 mil and curing at 800° F. shown in the Table IV.

TABLE IV.—CORROSION DATA

| Example | Coating thickness (mils) | Time (in hours) to first corrosion site and number of sites | | | | | | |
|---|---|---|---|---|---|---|---|---|
| | | 2 | 24 | 40 | 44 | 46 | 48 | 64 |
| 12 | 0.45 | 0 | 1 | | | | | |
| | 0.55 | 0 | 0 | 0 | 0 | 3 | | |
| | 0.75 | 0 | 0 | 0 | 0 | 0 | 0 | 3 |
| SC | 0.50 | (1) | | | | | | |
| | 0.55 | (1) | | | | | | |

[1] Many.

Similarly, the reaction product of Example 13 coated to thicknesses of 0.70 and 0.85 mil after being subjected to the standard ASTM salt fog test showed no corrosion sites until 89 hours had been reached.

Corrosion testing of the reaction product of Example 15 was conducted on coating thicknesses of between 0.5–1 mil. After inspection up to 13 days (about 300 hours) no corrosion sites were noticed. The commercially available product used as a control showed many corrosion sites after 3 hours on coatings between 0.5–1.1 mils. On the fourteenth day, some corrosion spots were noted on the panels coated with the reaction product of Example 15.

In order to show more clearly the effect of the addition of acidic sodium silicate sol on the reaction product formed by the mixture of the first and second groups of materials of Table II, along with the inclusion of aluminum, a series of evaluations were made at varying levels of acidic sodium silicate sol. The compositions are shown in the following Table V. In Table V, the binder was the same as that shown in Example 15.

TABLE V

| Example | Weight Percent | | | |
|---|---|---|---|---|
| | Binder | Sodium Silicate | Al | Na Silicate in binder |
| 16 | 60 | 0 | 40 | 0 |
| 17 | 55 | 5 | 40 | 8 |
| 18 | 50 | 10 | 40 | 16 |
| 19 | 45 | 15 | 40 | 25 |
| 20 | 40 | 20 | 40 | 33 |
| 21 | 35 | 25 | 40 | 42 |

The following Table VI shows the condition of Examples 16-20 of panels coated to various thicknesses and cured as indicated above at 800° F.

TABLE VI.—CORROSION DATA
[0-20% acidic sodium silicate sol]

| Example | Coating Thickness (mils) | Times in hours and number of sites | | | |
|---|---|---|---|---|---|
| | | 15 | 39 | 120 | 144 |
| 16 | 0.65 | (¹) | | | |
| | 0.70 | (¹) | | | |
| | 1.1 | (¹) | | | |
| | 1.2 | (¹) | | | |
| 17 | 0.65 | (¹) | | | |
| | 0.70 | (¹) | | | |
| | 0.80 | (¹) | | | |
| | 1.0 | (¹) | | | |
| 18 | 0.85 | 3 | (¹) | | |
| | 0.85 | 0 | (¹) | | |
| | 0.90 | 0 | (¹) | | |
| | 1.0 | 0 | (¹) | | |
| 19 | 0.75 | 0 | (¹) | | |
| | 0.85 | 0 | (¹) | | |
| | 0.90 | 0 | (¹) | | |
| | 0.95 | 0 | (¹) | | |
| 20 | 0.70 | 0 | 0 | 1 | 2 |
| | 0.75 | 0 | 0 | 0 | 4 |
| | 0.85 | 0 | 0 | 0 | 0 |
| | 0.85 | 0 | 0 | 0 | 0 |

¹ Many.

It is noted that at the inclusion of more than 15 weight percent acidic sodium silicate sol, the corrosion resistance of a cured coating is significantly improved. Thus the acidic sodium silicate sol content added to the reaction product of the first and second containers or added to the ingredients shown in Examples 5 and 6, when used with a pigment, is at least about 15 weight percent. On the basis of the pigment free binder alone, as shown later in following Table VIII the acidic sodium silicate sol is included in the range of at least about 25 weight percent.

It has been shown by the above data that the inclusion of at least 15 weight percent acidic sodium silicate sol results in significantly better corrosion resistance. However, variations in this material when obtained commercially can result in variations in corrosion resistance at about the 15% level. As shown by the data of Tables VI and VII based on the compositions of Table V, it is preferred that the acidic sodium silicate sol be included at more than 15% and preferably about 20-25%. Note in Table VI that significantly improved corrosion resistance results from the inclusion in Example 20 of 20% acidic sodium silicate sol compared with 15% or less in Examples 16-19.

After 5 months of storage, the binder of Example 21, to which the aluminum had not been added, had formed into a thixotropic state. Upon mild agitation, the gel reverted to its original fluid condition. Then aluminum pigment was added and test panels were prepared as described before. Table VII summarizes corrosion data obtained from this batch of material having the composition of Example 21 including 25% acidic sodium silicate sol.

TABLE VII.—CORROSION DATA
[Example 21-25% acidic Na silicate sol]

| Panel No. | Coating Thickness (mils) | Time in hrs. and accumulative total sites exclusive of edge effects | | | | |
|---|---|---|---|---|---|---|
| | | 336 | 360 | 456 | 480 | 500 |
| 1 | 0.60 | 0 | 2 | 2 | 2 | 5 |
| 2 | 0.65 | 0 | 0 | 0 | 0 | 0 |
| 3 | 0.70 | 0 | 0 | 0 | 0 | 0 |
| 4 | 0.80 | 0 | 0 | 0 | 0 | 0 |
| 5 | 0.90 | 0 | 0 | 0 | 0 | 0 |
| 6 | 1.0 | 0 | 0 | 0 | 0 | 0 |
| 7 | 1.2 | 0 | 0 | 0 | 0 | 1 |
| 8 | 1.4 | 0 | 0 | 0 | 0 | 0 |

Observations were made at 8 hours and thereafter daily. Aside from some slight edge effects from the uncoated panel edges, no corrosion sites were observed before 360 hours. A single edge effect was first noted at 264 hours for the 0.60 mil coating. Even after 500 hours, the edge effects were very slight, being non-existent on Panels 4, 6 and 8. At 500 hours, only the 0.60 mil coating showed some evidence of decreasing corrosion resistance. It is important to note that the control panels coated to a thickness of 0.5-1 mil with Example SC material were marked with numerous corrosion sites after only about 3 hours under the same conditions.

In order to more clearly show the relationship between the ingredients included in the binder alone, the percentage by weight of the binder ingredients in the examples are shown in Table VIII.

TABLE VIII.—UNPIGMENTED BINDER
[Ingredients (wt. percent)]

| | 1 | 2 | 3 | 4 | 5 | 6 | 8 | 9 | 10 | 11 | 12 | 13 | 14 | 15 | 20 | 21 |
|---|---|---|---|---|---|---|---|---|---|---|---|---|---|---|---|---|
| $CrO_3$ | 3.7 | 3.3 | 3.8 | 3.3 | 4.5 | 4.9 | 3.3 | 3.7 | 3.7 | 2.1 | 4.5 | 8.4 | 7.5 | 8.4 | 8.4 | 8.4 |
| $H_2O$ | 33.3 | 40.4 | 33.5 | 32.6 | 42.3 | 40.9 | 45.0 | 42.0 | 40.2 | 42.2 | 43.0 | 37.5 | 40.2 | 39.3 | 31.0 | 22.6 |
| $H_3PO_4$ (85%) | 33.3 | 33.7 | 16.5 | 19.5 | 14.2 | 14.2 | 16.5 | 15.3 | 16.3 | 16.7 | 13.5 | 15.0 | 13.3 | 13.3 | 13.3 | 13.3 |
| $MgHPO_4 \cdot 3H_2O$ | | | 20.6 | 19.5 | 13.3 | 13.0 | 12.1 | 13.3 | 13.3 | 13.3 | 13.3 | 13.3 | 13.3 | 13.3 | 13.3 | 13.3 |
| Mg | 3.3 | 2.7 | 0.7 | 0.7 | 0.7 | 0.6 | 0.6 | 0.7 | 1.5 | 0.7 | 0.7 | 0.8 | 0.7 | 0.7 | 0.7 | 0.7 |
| Na Silicate | 26.4 | 20.2 | 25.0 | 24.4 | 25.0 | 24.4 | 22.5 | 25.0 | 25.0 | 25.0 | 25.0 | 25.0 | 25.0 | 25.0 | 33.3 | 41.7 |

Sodium silicate solutions normally are readily decomposed by acids with the precipitation of silicic acid. However, the present invention provides a material which, because of its balance of ingredients and reaction products, can and does retain a substantial quantity of sodium silicate in an acid medium. The resultant stable product can be used as a thin corrosion inhibiting barrier for such materials as those based on iron.

Although the present invention has been described in connection with a number of specific examples, it will be understood by those skilled in the art the variations and modifications of which the present invention is capable such as the possible substitution of the ingredients at different concentrations which will modify the percentages or of equivaent ingredients which perform functions the same as those shown in the examples. For example, $MgHPO_4 \cdot 3H_2O$ form of magnesium phosphate was used because it is one of the more readily soluble types of magnesium phosphate.

What is claimed is:

1. An improved inorganic phosphate material useful as a binder for a corrosion resistant coating, the material being the reaction product of a mixture consisting essentially of, by weight:

| | Percent |
|---|---|
| Phosphoric acid when calculated as 85% $H_3PO_4$ | 13 to <16.7 |
| Chromic acid | >2.1 to 8.5 |
| Magnesium | 0.6 to <1.5 |
| Magnesium phosphate dibasic | 12 to <19.5 |
| Acidic sodium silicate sol when calculated as 34% $SiO_2$ | 25-50 |
| and | |
| Water | 20-45 | the ratio of the phosphoric acid to the magnesium phosphate dibasic being at least 1.

2. The improved material of claim 1 in which the mixture consists essentially of, by weight:

| | Percent |
|---|---|
| Phosphoric acid when calculated as 85% $H_3PO_4$ | 13-16 |
| Chromic acid | 3-8 |
| Magnesium | 0.6-0.8 |
| Magnesium phosphate dibasic | 13-16 |
| Acidic sodium silicate sol when calculated as 34% $SiO_2$ | 33-42 |
| and | |
| Water | 22-45 | the ratio of the phosphoric acid to the magnesium phosphate dibasic being at least 1.

3. An improved pigmented inorganic phosphate coating material which is the reaction product of a mixture consisting essentially of, by weight:

| | Percent |
|---|---|
| Phosphoric acid when calculated as 85% $H_3PO_4$ | 8 to <12 |
| Chromic acid | >1.3 to 5 |
| Magnesium | 0.4 to <0.9 |
| Magnesium phosphate dibasic | 8 to <12 |
| Acidic sodium silicate sol when calculated as 34% $SiO_2$ | 15-30 |
| Water | 13-30 | with the balance finely divided aluminum;
the ratio of the phosphoric acid to the magnesium phosphate dibasic being at least 1.

4. The improved pigmented material of claim 3 in which the mixture consists essentially of, by weight:

| | Percent |
|---|---|
| Phosphoric acid when calculated as 85% $H_3PO_4$ | 8-10 |
| Chromic acid | 2-5 |
| Magnesium | 0.4-0.5 |
| Magnesium phosphate dibasic | 8-10 |
| Acidic sodium silicate sol when calculated as 34% $SiO_2$ | 20-25 |
| Water | 20-30 | with the balance finely divided aluminum;
the ratio of the phosphoric acid to the magnesium phosphate dibasic being at least 1.

5. A method for making an inorganic phosphate material useful as a binder for a corrosion resistant coating, comprising the steps of:
first mixing together, by weight, more than 2.17 to 8.57 chromic acid, 20–457 water, 13% to less than 16.7% phosphoric acid calculated as 85% $H_3PO_4$, and 0.6% to less than 1.5% magnesium until the reaction producing a reaction product is completed;
dissolving in the reaction product 12 to less than 19.5 weight percent magnesium phosphate dibasic;
cooling the resulting solution to about room temperature; and then
adding 25–50 weight percent acidic sodium silicate sol calculated as 34% $SiO_2$.

6. A method for making a pigmented inorganic phosphate material in which aluminum pigment is included, comprising the steps of:
first making a mixture by
(a) making a reaction product by mixing together, by weight, more than 2.1% to 8.5% chromic acid, 20–45% water, 13% to less than 16.7% phosphoric acid calculated as 85% $H_3PO_4$, and 0.6% to less than 1.5% magnesium until the reaction producing the reaction product is completed;
(b) dissolving in the reaction product 12 to less than 19.5 weight percent magnesium phosphate dibasic;
(c) cooling the resulting solution to about room temperature; and
(d) adding 25–50 weight percent acidic sodium silicate sol calculated as 34% $SiO_2$ to complete the first mixture; and then
adding finely divided aluminum to the mixture to make the pigmented inorganic phosphate material consisting essentially of, by weight:

| | Percent |
|---|---|
| Phosphoric acid when calculated as 85% $H_3PO_4$ | 8 to <12 |
| Chromic acid | >1.3 to 5 |
| Magnesium | 0.4 to <0.9 |
| Magnesium phosphate dibasic | 8 to <12 |
| Acidic sodium silicate sol when calculated as 34% $SiO_2$ | 15-30 |
| Water | 13-30 | with the balance finely divided aluminum;
the ratio of the phosphoric acid to the magnesium phosphate dibasic being at least 1.

7. A method for making from ingredients an inorganic phosphate material useful as a binder for a corrosion resistant coating, comprising the steps of:
making a reaction product from a first portion of the ingredients, the first portion consisting essentially of, by weight based on total ingredients, 1.1–1.8% chromic acid, 10–20% water, about 6.5% phosphoric acid calculated as 85% $H_3PO_4$, and 0.6% to less than 1.5% magnesium to form the reaction product;
making a solution from a second portion of the ingredients, the second portion consisting essentially of, by weight based on total ingredients, more than 1% up to 6.7% chromic acid, 16–25% water, 6.5%–10% phosphoric acid calculated as 85% $H_3PO_4$, and 12% to less than 19.5% magnesium phosphate dibasic to form the solution;
mixing together the reaction product and the solution;
cooling to about room temperature; and then
adding 25–50 weight percent based on total ingredients, of acidic sodium silicate sol calculated as 34% $SiO_2$.

8. A method for making from ingredients a pigmented inorganic phosphate material in which aluminum pigment is included, comprising the steps of:
making a reaction product from a first portion of the ingredients, the first portion consisting essentially of, by weight based on total ingredients 0.7–1% chromic acid, 6–11% water, about 4% phosphoric acid and 0.4% to less than 0.9% magnesium;
making a solution from a second portion of the ingredients, the second portion consisting essentially of, by weight based on total ingredients, more than 0.6% up to 4% chromic acid, 10–20% water, 4–7% phosphoric acid, and 8% to less than 12% magnesium phosphate dibasic;
mixing together the reaction product and the solution;
cooling to about room temperature;
adding 15–30 weight percent, based on total ingredients acidic sodium silicate sol calculated as 34% SiO$_2$; and then adding 33–40 weight percent based on total ingredients finely divided aluminum.

References Cited

UNITED STATES PATENTS

| 2,529,206 | 11/1950 | Winslow et al. | 106—74 |
| 2,807,552 | 9/1957 | Robinson et al. | 106—74 |
| 2,998,328 | 8/1961 | Munger et al. | 106—84 |
| 3,130,061 | 4/1964 | McMahon et al. | |
| 3,214,302 | 10/1965 | Brodt et al. | 106—74 |

JAMES E. POER, Primary Examiner

U.S. Cl. X.R.

106—84